United States Patent [19]
Marcus et al.

[11] Patent Number: 6,067,161
[45] Date of Patent: May 23, 2000

[54] APPARATUS FOR MEASURING MATERIAL THICKNESS PROFILES

[75] Inventors: Michael A. Marcus, Honeoye Falls; Jiann-Rong Lee, Webster; Harry W. Harris, Hilton; Richard R. Kelbe, Fishers, all of N.Y.

[73] Assignee: Eastman Kodak Company, Rochester, N.Y.

[21] Appl. No.: 09/216,094

[22] Filed: Dec. 18, 1998

Related U.S. Application Data

[60] Provisional application No. 60/106,129, Oct. 29, 1998.

[51] Int. Cl.$^7$ ........................................................ G01B 9/02
[52] U.S. Cl. ........................... 356/357; 356/359; 356/360
[58] Field of Search ..................................... 356/359, 360, 356/357

[56] References Cited

U.S. PATENT DOCUMENTS

| | | |
|---|---|---|
| 3,319,515 | 5/1967 | Flournoy . |
| 5,473,432 | 12/1995 | Sorin . |
| 5,596,409 | 1/1997 | Marcus et al. . |
| 5,610,716 | 3/1997 | Sorin et al. . |
| 5,659,392 | 8/1997 | Marcus et al. . |
| 5,731,876 | 3/1998 | Venkatesh et al. . |

*Primary Examiner*—Robert H. Kim
*Attorney, Agent, or Firm*—Susan L. Parulski

[57] ABSTRACT

An apparatus for determining a thickness profile of a moving material having at least two optical interfaces. A transport apparatus transports a length of moving material at a predetermined flatness through a measurement region. A recessed track disposed in the channel provides an area of non-contact in the measurement region. An interferometer apparatus collects a portion of a beam of light reflected from the optical interfaces of the moving length and generates an interference signal representative of the collected light. An analyzer then analyzes the interference signal to determine a thickness profile of the material in the first direction.

12 Claims, 16 Drawing Sheets

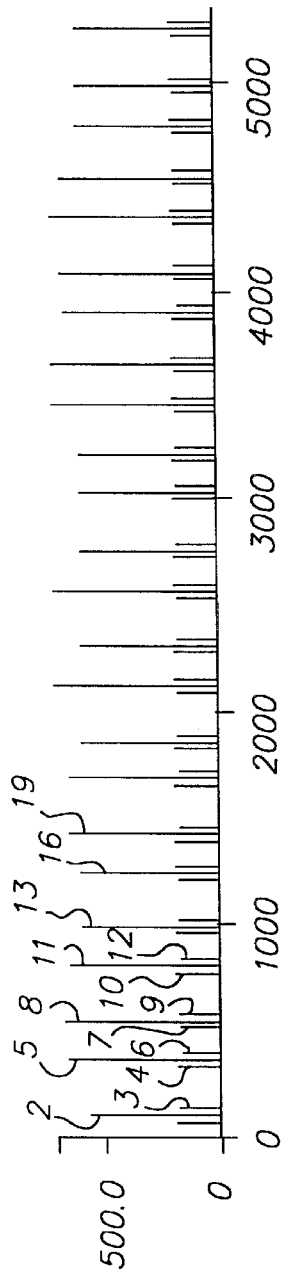
FIG. 16
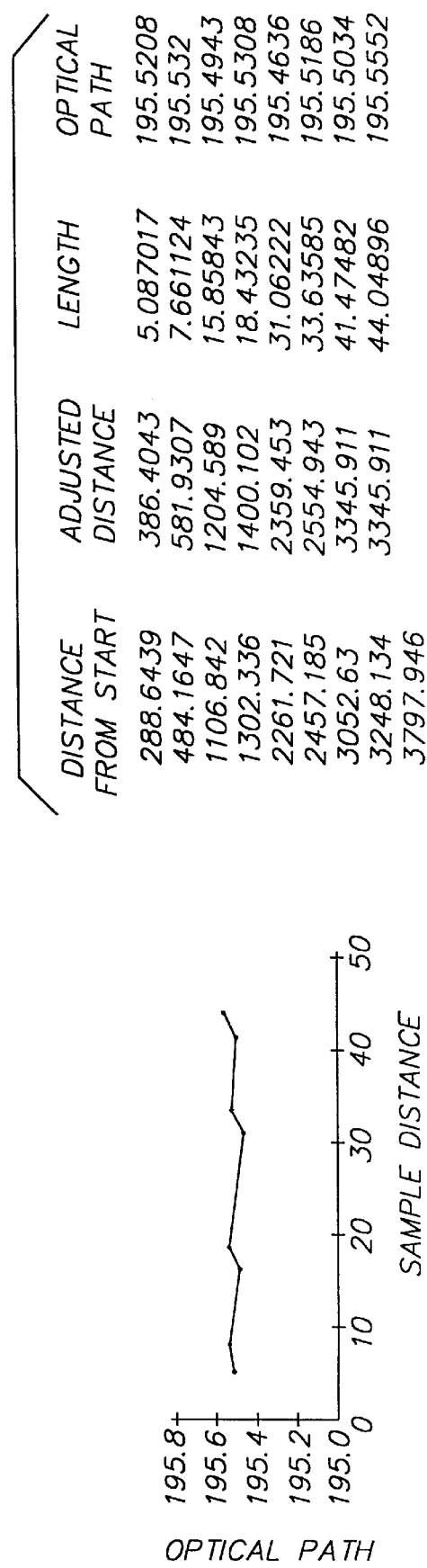
FIG. 20
FIG. 21

| DISTANCE FORM START | ADJACENT PEAKS | AMPLITUDE CLASSIFIER |
|---|---|---|
| 288.6439 | 195.5298 | 0 |
| 484.1647 | 195.532 | 1 |
| 679.6967 | 427.1452 | 0 |
| 1106.842 | 195.4943 | 0 |
| 1302.336 | 195.5308 | 1 |
| 1497.867 | 763.8541 | 0 |
| 2261.721 | 195.4636 | 0 |
| 2457.185 | 195.5168 | 1 |
| 2652.701 | 339.9290 | 0 |
| 3052.63 | 195.5034 | 1 |
| 3248.134 | 195.5552 | 1 |
| 3443.689 | | 0 |
| 3797.946 | | |

APPARATUS FOR MEASURING MATERIAL THICKNESS PROFILES

CROSS REFERENCE TO RELATED APPLICATION

This is a provisional application of Ser. No. 60/106,129, filed Oct. 29, 1998.

Reference is made to commonly assigned application U.S. Ser. No. 09/216,045, entitled "METHOD FOR MEASURING MATERIAL THICKNESS PROFILES", and filed on common date herewith in the names of Michael A. Marcus, Jiann-Rong Lee, Stanley Gross, and Harry W. Harris, and which is assigned to the assignee of this application.

Reference is made to commonly assigned application U.S. Ser. No. 09/216,044, entitled "METHOD FOR PROCESSING INTERFEROMETRIC MEASUREMENT DATA", and filed on common date herewith in the names of Michael A. Marcus and Jiann-Rong Lee, and which is assigned to the assignee of this application.

FIELD OF THE INVENTION

The present invention relates generally to the measurement of physical properties of a moving object by non-contact optical interferometry. More particularly, the invention concerns an apparatus and method for providing material thickness profiles of a moving length of material such as film, sheet, or web.

BACKGROUND OF THE INVENTION

In many industrial processes, control of material thickness is of critical importance, particularly during the manufacturing of layered or coated web material. For example, the manufacturing of photographic film requires the formation of a uniform layer of emulsion on a base support. Non-contact thickness measuring means are preferred so as to not adversely affect the characteristics of the material and to minimize dust, dirt or film residue buildup in a sensor head of a measurement apparatus. Residue buildup on a measurement sensor head would adversely affect the measurement resolution and could result in the loss of data.

Methods for measuring the thickness of a material using interferometers are known in the prior art. For example, U.S. Pat. No. 3,319,515 (Flournoy) relates to the determination of thickness on the basis of interferometric optical phase discrimination. U.S. Pat. No. 5,473,432 (Sorin) and U.S. Pat. No. 5,610,716 (Sorin et al) relate to an apparatus and method for measuring film thickness of a moving film, employing optical reflectrometry. Factors of a moving material, such as vibrations, lateral movements, flutter coupled with angular variation, standing waves, and fluctuations, would render the thickness measurements inaccurate and unintelligible or result in a loss of data. Sorin attempts to account for flutter through the incorporation of an adjustable numerical aperture lens. However, in situations of high flutter, continuous adjustment of the numerical aperture lens is impractical. As the numerical aperture is decreased to tolerate additional flutter, the acceptance angle for reflected light going back into the fiber decreases.

Non-contact thickness measurement methods based on beta, Rutherford backscattering or gamma rays are known to the prior art. These non-contact methods require relatively large beam spot sizes (e.g., one-half inch diameter or larger) to acquire a measurement with sufficient signal-to-noise ratio to provide a useful thickness measurement profile.

Accordingly, a need continues to exist for an apparatus and method for measuring the thickness of a moving material without adversely affecting the material. A need also exists to measure materials with a high degree of lateral resolution. In situations wherein some loss of data may occur, a need further exists to account for the lost data, and to provide a meaningful thickness profile.

SUMMARY OF THE INVENTION

An object of the present invention is to provide an improved apparatus and method for measuring the thickness of a moving material.

A further object of the present invention is to provide such an apparatus and method to provide a thickness profile of the material in the direction of the movement of the material.

Still another object of the present invention is to provide such an apparatus and method which provides accurate and reliable measurements with minimum loss of thickness information and provides a meaningful thickness profile.

Yet another object of the present invention is to provide such an apparatus and method which provides measurements with a high degree of lateral resolution.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an apparatus for determining a thickness profile of a moving material having at least two optical interfaces. The apparatus includes a transport apparatus transporting a length of the moving material in a first direction along a transport path through a measurement region. The moving length maintains a substantially constant velocity of the length through the measurement region. The transport apparatus includes a channel maintaining a predetermined flatness to the moving length through the measurement region. A recessed track disposed in the channel provides an area of non-contact in the measurement region. A beam of light is directed toward a segment of the moving length within the measurement region wherein an interferometer apparatus collects a portion of the light reflected from the optical interfaces of the segment of the moving length and generates an interference signal representative of the collected light. An analyzer then analyzes the interference signal to determine a thickness profile of the material in the first direction.

The present invention provides an improved apparatus and method for providing material thickness profiles of a moving length of material, such as film, sheet, or web. Factors of the moving web are taken into account to provide accurate measurements with minimum loss of thickness. Non-contact measuring means are employed, thereby not adversely affecting the measurements or the characteristics of the material. The present invention can be employed for quality control purposes of the manufacturing equipment or for certification procedures whereby a standard sample can be measured multiple times to test and compare manufacturing equipment performance.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 16 generally shows a triplet peak formation in absolute value representation.

FIG. 20 shows a tabular format showing the distances for the peaks of FIG. 16 after applying a pattern recognition classifier.

FIG. 21 shows a graph of the table data of FIG. 20.

DETAILED DESCRIPTION OF THE INVENTION

Figure 1:
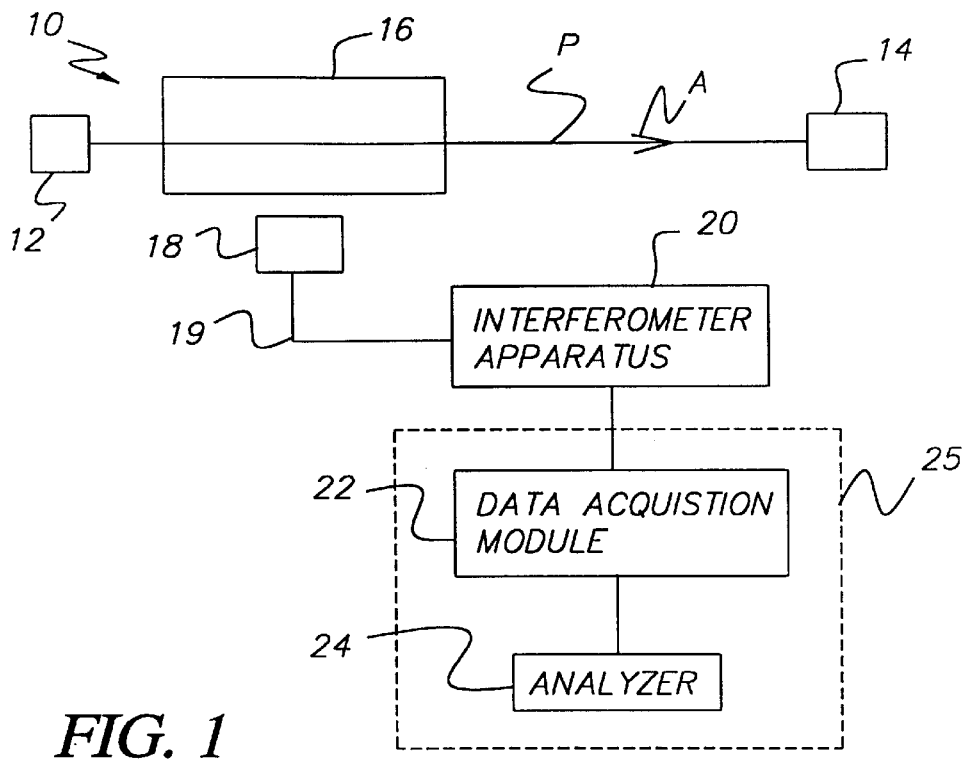
FIG. 1 shows a measurement system for measuring material thickness profiles in accordance with the present invention.

The following is a detailed description of the preferred embodiments of the invention, reference being made to the drawings in which the same reference numerals identify the same elements of structure in each of the several figures.
Apparatus and Method FIG. 1 generally illustrates a measurement system 10 in accordance with the present invention suitable to determine a thickness profile of a moving material having a predetermined width. A length of material M is transported along a transport path P from an inlet 12 to an outlet 14 in a direction indicated by arrow A. The length of material M has a leading and trailing end. As shown in FIG. 1, disposed in the transport path P is a measurement and transport apparatus 16, which is more particularly described below. As illustrated in FIG. 1, disposed adjacent measurement and transport apparatus 16 is an optical probe 18 arranged in an appropriate orientation with material M to enable the measurement of the thickness profile of material M. This orientation will be further discussed below.

Figure 2:
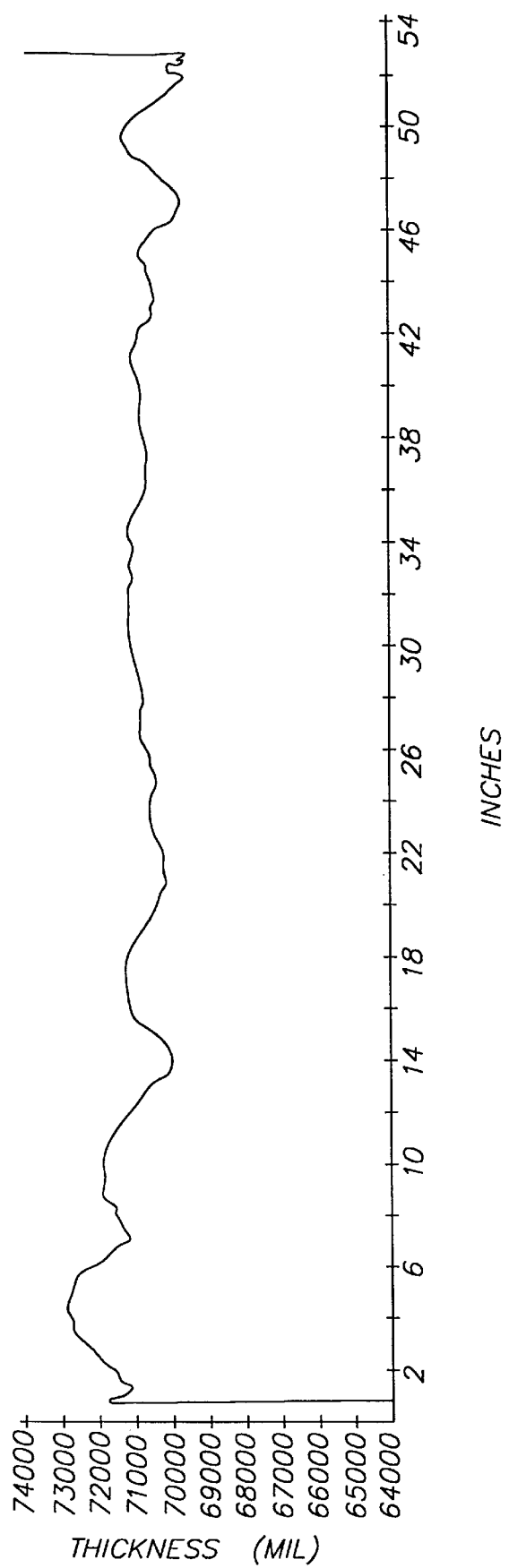
FIG. 2 shows an example of a material thickness profile of a length of material provided by the measurement system of FIG. 1.

As the material is transported, optical probe 18 directs a beam of light through single mode optical fiber 19 toward a segment of the moving material. An interferometer apparatus 20 collects a portion of the light reflected from the optical interfaces of the segment of material M, and generates an interference signal representative of the collected light. The interference signals are provided to a photodetector internal to interferometer apparatus 20 and converted to an analog electrical signal. The analog electrical signal is amplified and filtered and then converted to digital data by an A-D converter in a data acquisition module 22. The digital data is then converted to thickness values by an analyzer 24. Optionally, data acquisition module 22 and analyzer 24 may be incorporated into a computer 25, as illustrated in FIG. 1. An ordered array of the thickness values provides a thickness profile of the material in the direction of movement. FIG. 2 shows an example of a thickness profile (y-axis) for a 54 inch length of the material (x-axis).

Figure 3:
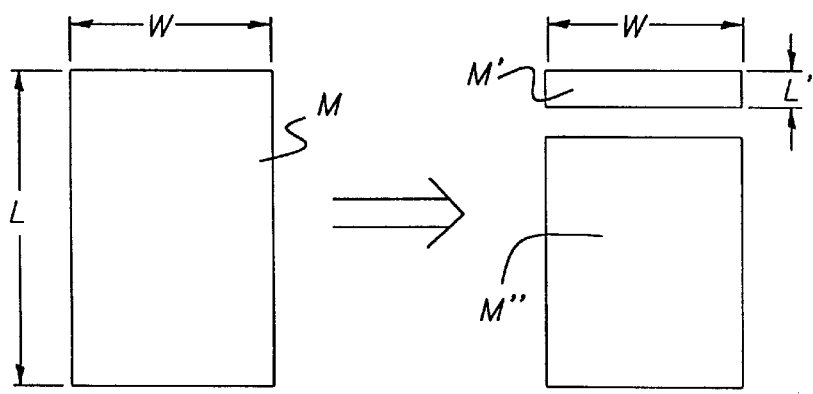
FIG. 3 shows a length of material illustrating the orientation of the material for lengthwise and widthwise thickness profile measurements.

Material M may be in sheet or web form and can be comprised of single or multiple layers. For ease of discussion, material M will be assumed to be comprised of a single layer having two optical interfaces: a front surface F and a back surface B. Further, material M can be transparent, colored, or partially opaque (i.e., an optical density less than 4 at the measured wavelength). FIG. 3 illustrates a length of material M having a length L and a width W. The thickness profile illustrated in FIG. 2 can be a lengthwise thickness profile (i.e., the x-axis of FIG. 2 has a range of the value of length L), or a widthwise thickness profile (i.e., the x-axis of FIG. 2 has a range of the value of width W). For a widthwise thickness profile, those skilled in the art will recognize that it may be preferable to slit the length of material M into a strip of substantially constant width W. For example, as illustrated in FIG. 3, strip M' is slit from material M, and strip M' would be used for the widthwise thickness profile measurement. (Material M" being the remaining portion of material M after strip M' is removed.)

Figure 4:
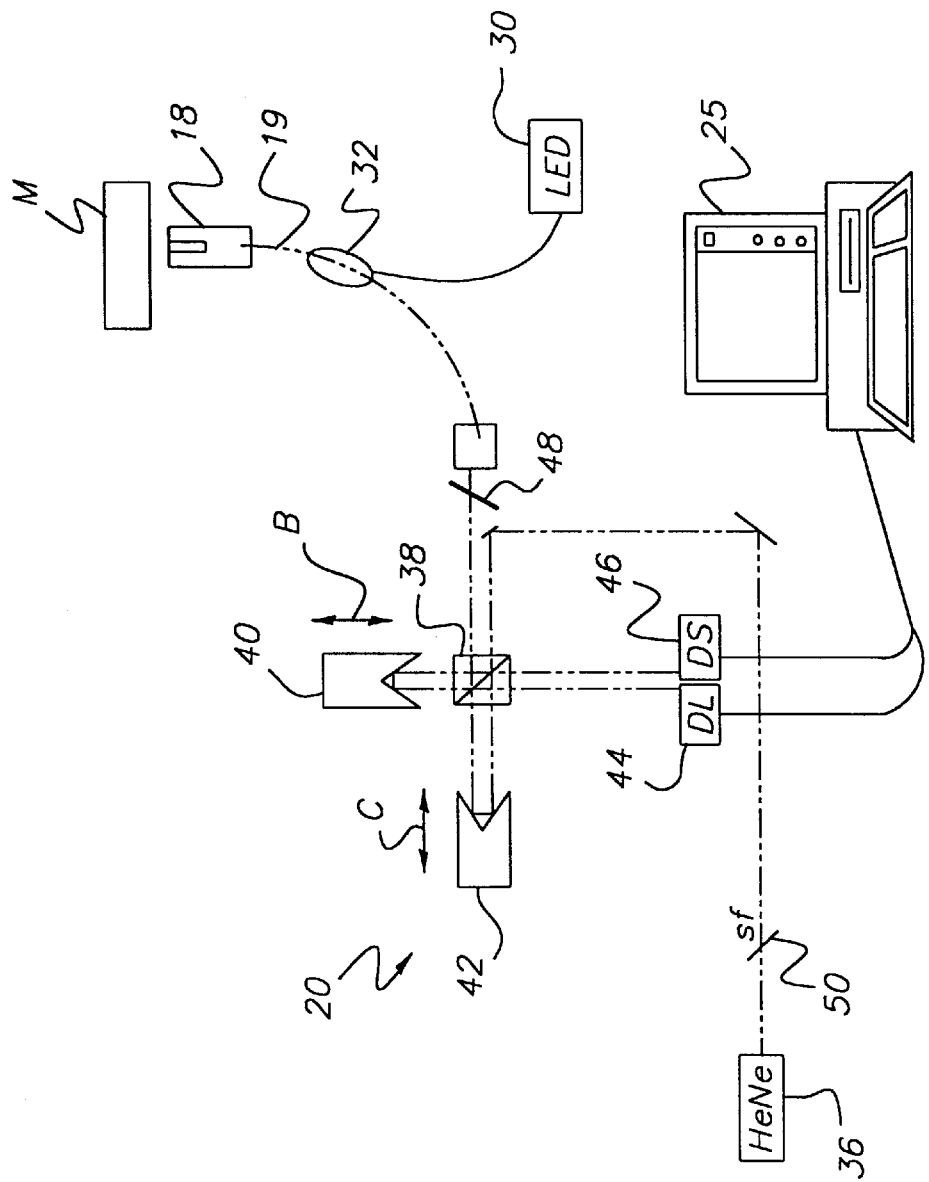
FIG. 4 shows an interferometer apparatus suitable for use with the measurement system of FIG. 1.

A suitable interferometer apparatus 20 for use with measurement system 10 is disclosed in U.S. Pat. No. 5,659,392 (Marcus et al) and U.S. Pat. No. 5,596,409 (Marcus et al), commonly assigned and incorporated herein by reference, which describes an apparatus and method for measuring a thickness of a material. Interferometer apparatus 20 is preferably a dual interferometer apparatus of a Michelson configuration in an autocorrelation mode, as shown in FIG. 4. Optical probe 18 directs a beam of light from a non-coherent light source 30 (such as light-emitting diode (LED) toward a segment of the moving length of material M. Optical probe 18 includes a Gradient Index lens (e.g., GRIN). The light is reflected on the front F and back B surfaces of material M and the light signals are introduced into two arms of interferometer apparatus 20 through a 1×2 optical coupler 32 and a fiber collimator 34. A coherent light source 36 (such as a HeNe laser) emits a beam of light toward a beam splitter 38. Beam splitter 38 divides the beams of light into pairs of light beams directed toward a pair of hollow-cube retroreflectors 40,42 which are mounted 90 degrees apart and move in perpendicular directions as shown by arrows B and C. The outputs of interferometer apparatus 20 are directed to a pair of detectors 44,46 for LED 30 and laser 36, respectively. The non-coherent light of LED 30 follows the same light path as the coherent light path of HeNe laser 36, but in reverse time order. A band-pass filter 48 blocks the light from laser 36 being incident on material M. A second filter 50 prevents light from LED 30 from interfering with the light from laser 36.

As such, the laser interferometer tracks the distance the optical path has changed, with the laser signal providing data acquisition trigger signals, at constant distance intervals, for collecting interferometric data from the LED interferometer. Therefore, the purpose of the laser interferometer is to track the distance the optical path moves while the LED interferometer is collecting data from material M.

Applicants have discovered that a particular degree of flatness of material M must be maintained when the material moves past optical probe 18. If the flatness is not maintained, aberrations such as vibrations, lateral movements, standing waves, and fluctuations render thickness measurements inaccurate and unintelligible. Accordingly, Applicants have devised a measurement and transport apparatus 16 to maintain material M to a predetermined flatness. Applicants have determined that, for a particular lens, material M must be flat to within one degree (1°) of normal from the transport path within the measurement region. More particularly, Applicants have determined that optical probe 18 provides for a one degree variation from normal with a 2 mm depth of focus.

Measurement and transport apparatus 16 is now more particularly described. This apparatus, illustrated in FIGS. 5–14, allows for the transport of the material at the necessary degree of flatness and speed to provide accurate measurements without data loss.

Figure 8:
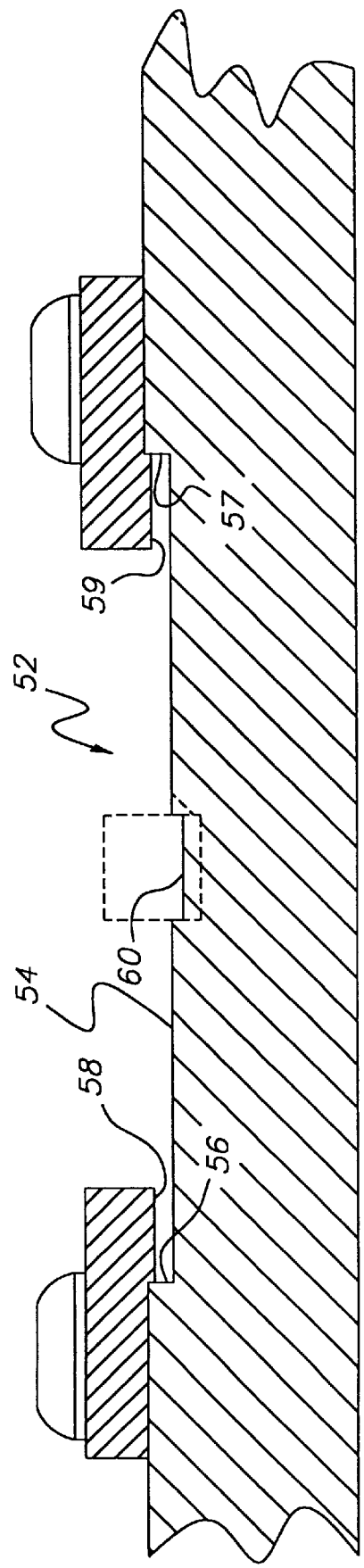
FIG. 8 shows an enlarged partial side view of the channel of the transport and measurement apparatus.

Measurement and transport apparatus 16 includes a transport mechanism 50 for transporting a length of material M in a first direction along transport path P through a measurement zone Z adjacent optical probe 18 as shown in FIG. 8. Transport mechanism 50 includes an open channel 52 defining the transport path P. Channel 52 is defined by a bottom wall 54 having a recessed web relief track 60 disposed along its length, two side walls 56,57, and two tops walls 58,59. The two top walls are spaced apart to provide an opening in the channel to allow the optical probe to be disposed adjacent the moving material M. By this opening channel 52 having recessed web relief track 60, a portion of material M in measurement zone Z does not contact any component of the transport mechanism.

Channel 52 has a width greater than, but substantially equal to, the width of the material so that the material does not move laterally along the sample path. For example, for a length of material M having a width of approximately 35 mm, channel 52 would have a width of 35+~2 mm. Similarly, the distance between top walls 58,59 and bottom wall 54 must be sufficient to transport the maximum web thickness of the samples being measured. For web thickness in the range of 2–10 mils, a distance of 20 mils is sufficient, particularly if the material includes knurled portions. The combination of the width dimension and the length dimension of channel 52 maintaining the material flat in the measurement region and reduces edge effects as the material enters and exits the channel. Applicants have discovered that a sufficiently long channel is advantageous to maintaining the material flat, and accordingly, prefer that the length of the base support be at least 5 times the width of the material. For example, for a material having a width of approximately 35 mm, channels of about 7–32 inches in length have been found suitable.

Figure 6:
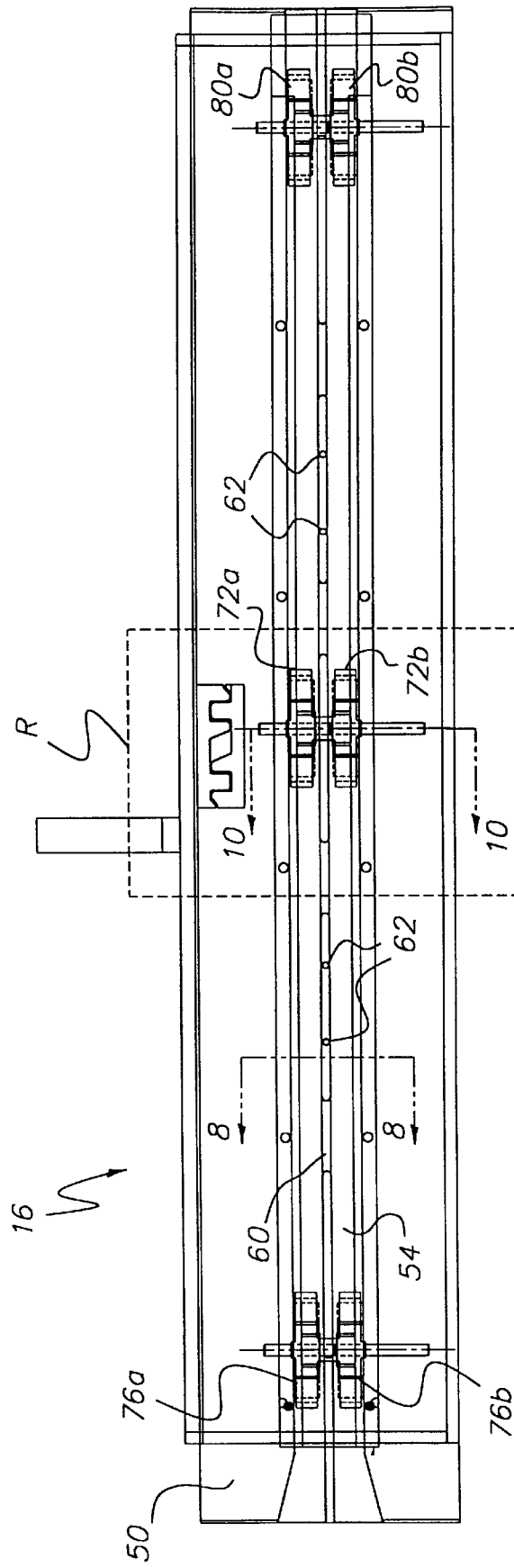
FIG. 6 shows a top view of the transport and measurement apparatus of FIG. 5.
Figure 7:
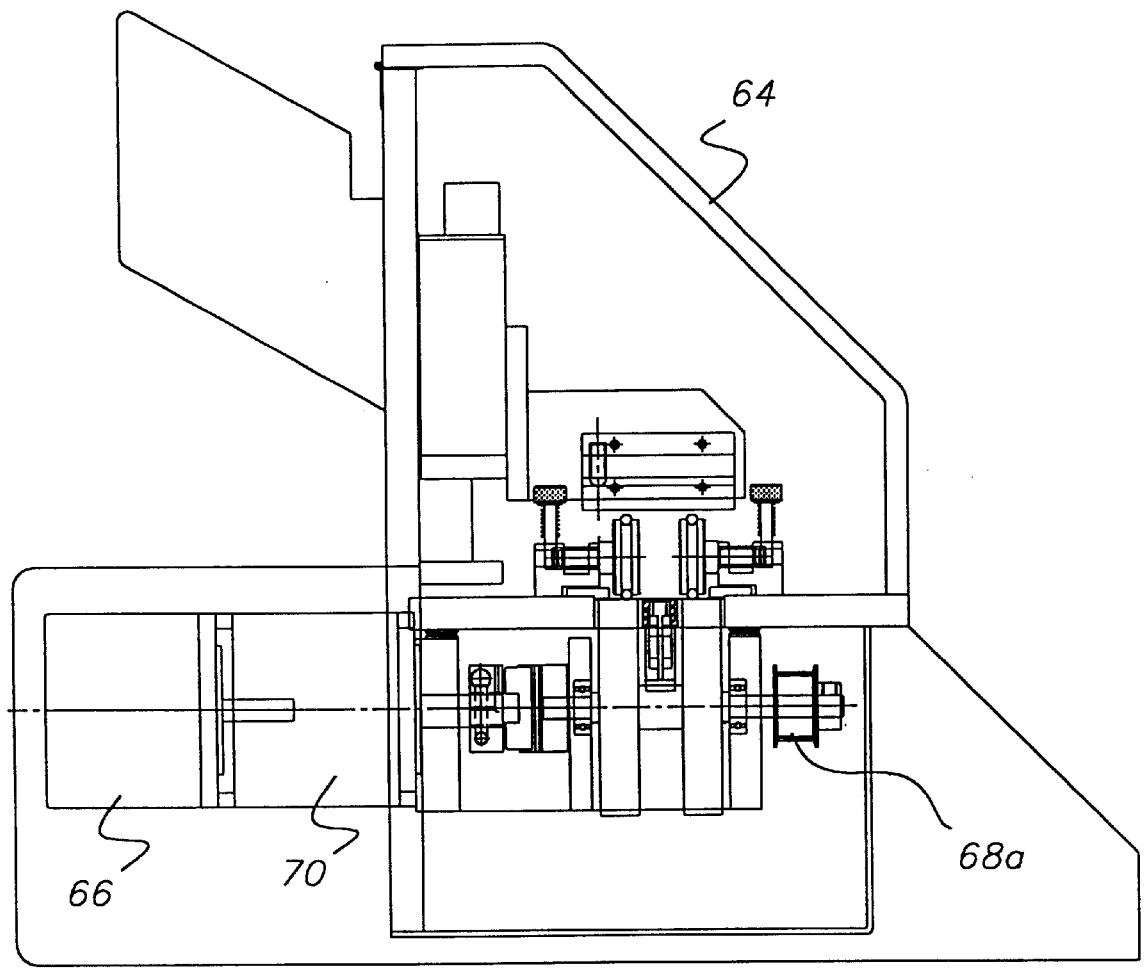
FIG. 7 shows a side view of the transport and measurement apparatus of FIG. 5.

Web relief track 60 is recessed within bottom wall 54 to provide a portion of material M which is not contacted by transport mechanism 50. Optional ionized air inlets 62 are positioned along web relief track 60 to prevent static build-up on material M as it is transported, as illustrated in FIG. 6. An optional static-preventing member 64 may surround a portion of or all of measurement and transport apparatus 16 to prevent static build-up on the material. For example, such a static-preventing member could be an ion-purged transparent cover which provides ionized air.

Transport mechanism 50 also includes a stepper motor 66 (refer to FIG. 7) in mechanical association with a drive roller 68 (refer to FIG. 5) to transport material M through channel 52. Stepper motor 66 is controlled by a Programmable Logic Controller (PLC) or computer (not shown) to obtain various sample speeds. A preferred arrangement includes a 3:1 planetary gear 70 employed in the mechanical association. This gearing arrangement allows stepper motor 66 to operate at a higher, smoother speed. In addition, the gearing arrangement increases the torque at drive roller 68. Each one of a pair of drive pinch rollers 72a,72b (refer to FIG. 6) forms a nip with drive roller 68 wherein the material passes through the nips at a predetermined constant speed S. Drive pinch rollers 72a,72b are spaced apart from each other to provide a region on material M that does not contact the components of the transport so as to adversely affect the characteristics of the material.

Figure 5:
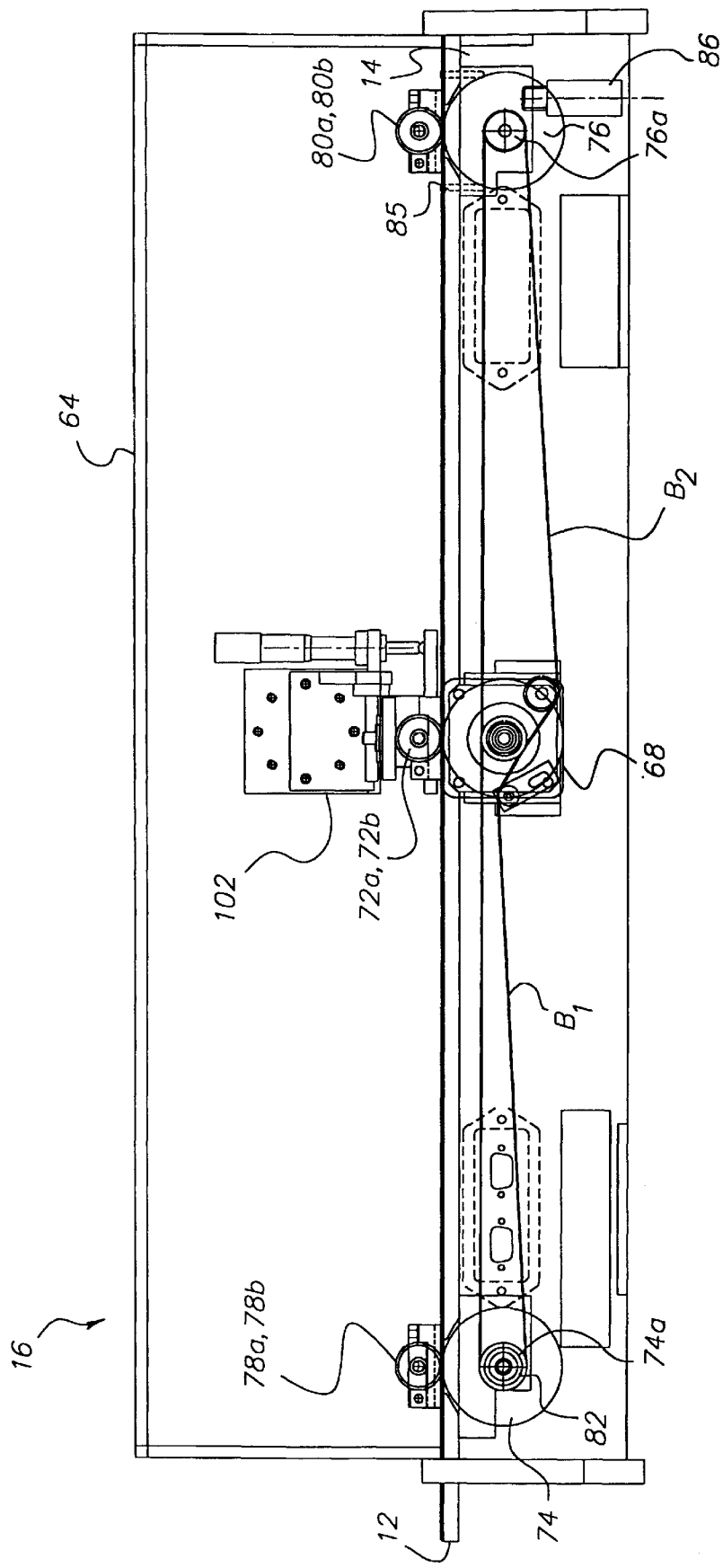
FIG. 5 shows a front view of a transport and measurement apparatus in accordance with the present invention.

Drive roller 68 is in mechanical association with an inlet roller 74 disposed near inlet 12 of transport path P, and an outlet roller 76 disposed near outlet 14 of transport path P, as illustrated in FIG. 5. For ease of discussion, rollers 68, 74 and 76 are of substantially equal diameter. The mechanical association can be accomplished, for example, by toothed belts $B_1, B_2$ coupled to toothed pulleys 68a, 74a, and 76a attached to roller shafts of drive 68, inlet 74, and outlet 76 rollers, respectively. Drive roller toothed pulley 68a (shown in FIG. 7) is a dual pulley for coupling to both toothed belts $B_1$ and $B_2$. All three rollers (drive 68, inlet 74, and outlet 76) have a recessed center portion which aids in reducing dirt buildup reduces the amount of contact with material M, and provides for a non-contact measurement region.

Figure 10:
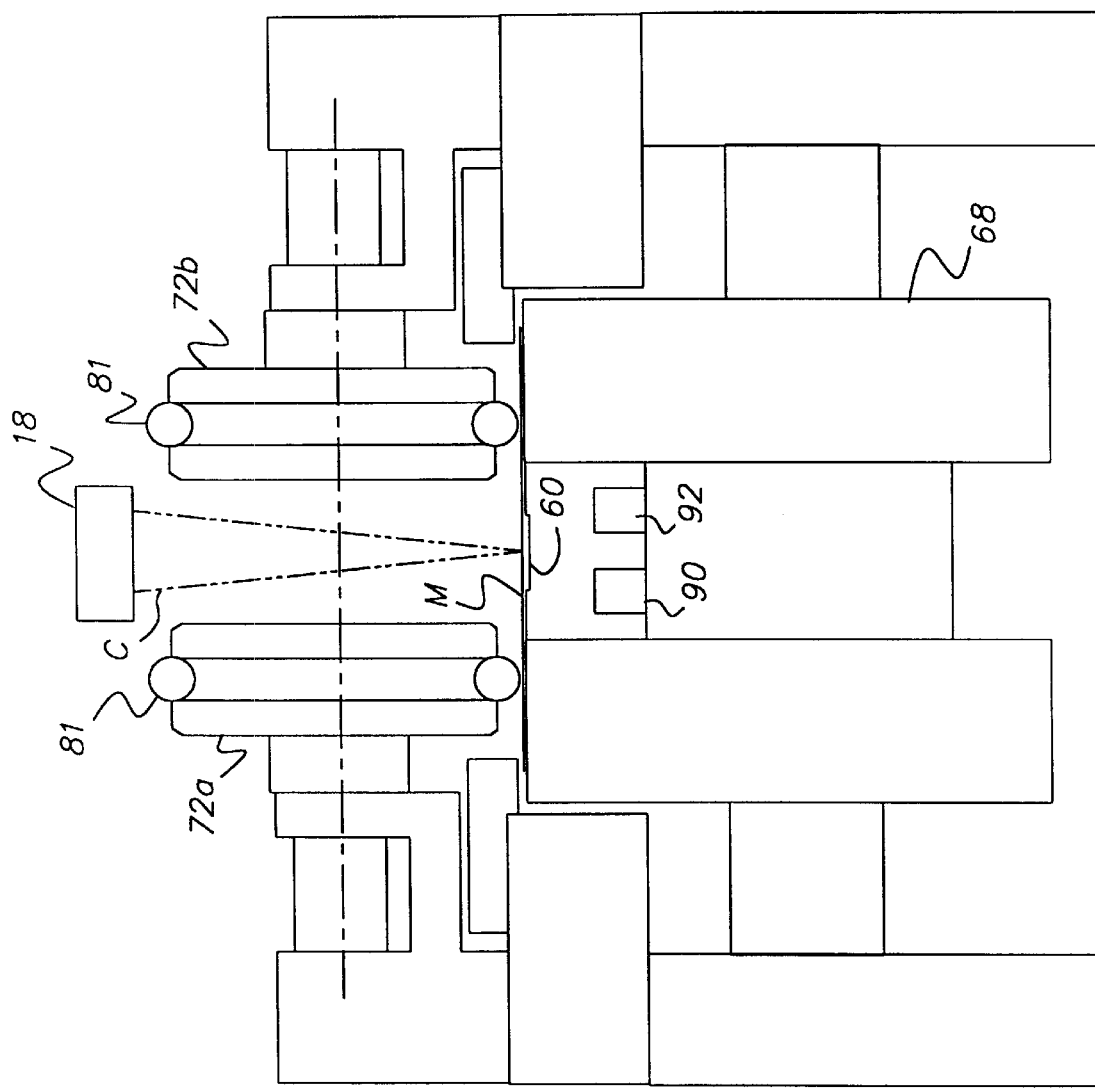
FIG. 10 shows a partial side view of the drive roller and the drive pinch rollers.
Figure 11:
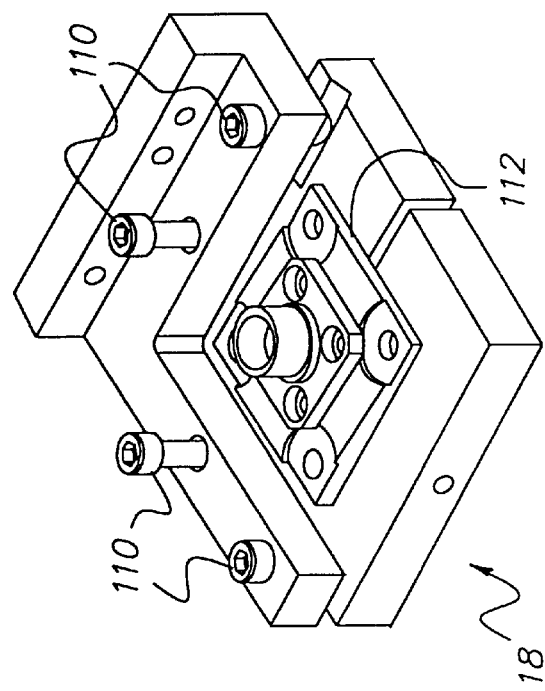
FIGS. 11–14 show an illustrative view, side views, and a top view of the optical probe mount in accordance with the present invention.
Figure 14:
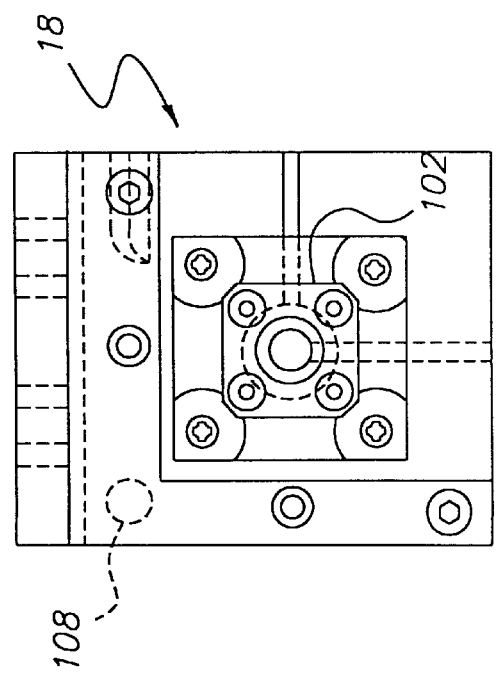
Figure 12:
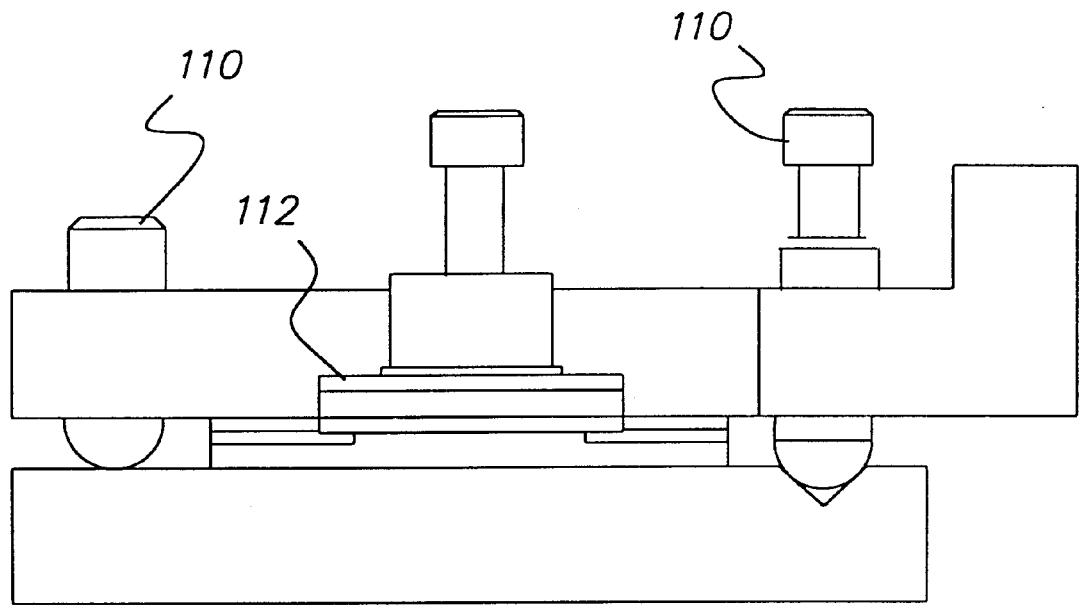
Figure 13:
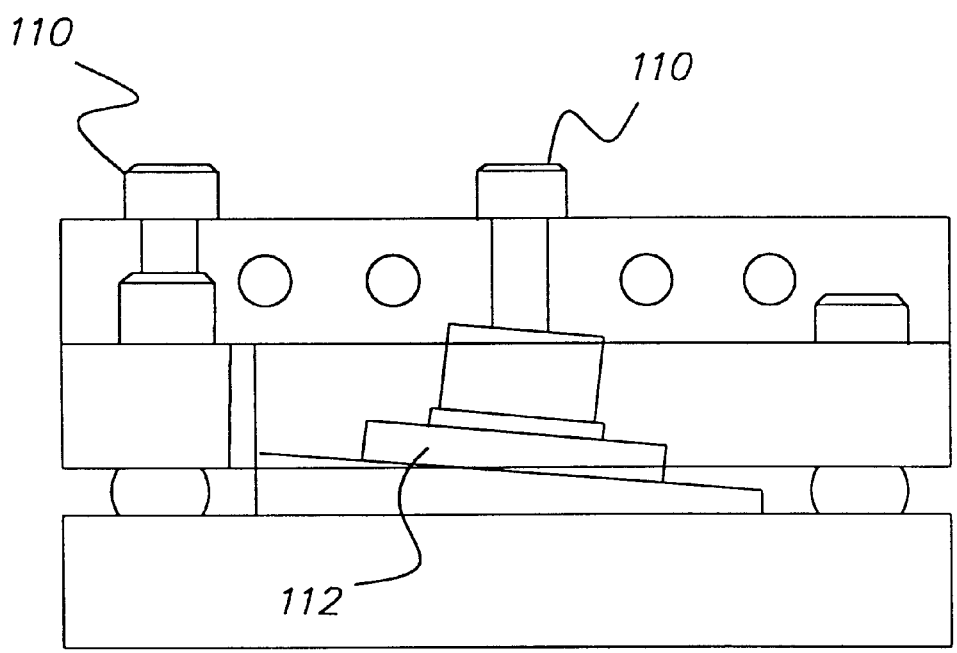

A pair of inlet pinch rollers 78a,78b form nips with inlet roller 74. Similarly, a pair of outlet pinch rollers 80a,80b form nips with outlet roller 76. Drive, inlet, and outlet rollers 68,74,76 are preferably comprised of anodized aluminum with a urethane coating. Drive pinch rollers 72a,72b are preferably comprised of a Delrin material, as is inlet and outlet nip rollers 78a,78b, 80a,80b. The drive pinch rollers and inlet and outlet nip rollers may include a suitable polymer such as an O-ring 81 of EDPM, as illustrated in FIG. 10, to provide for non-slippage during transport.

Inlet roller 74 operates at a speed slightly less than speed S of drive roller 68. This operation is accomplished by toothed pulley 74a coupled to drive roller dual toothed pulley 68a by means of belt $B_1$. Inlet roller pulley 74a has slightly more teeth per revolution than drive roller dual toothed pulley 68a. A roller clutch 82 is coupled to inlet roller 74 to aid in uniform transport of material M. As the length of material M enters the nip formed with drive roller 68, the length is pulled from the slightly slower speed inlet roller 74 with no drag due to the free rolling clutch of roller clutch 82.

Outlet roller 76 operates as a speed slightly greater than speed S of drive roller 68. This operation is accomplished by toothed pulley 76a coupled to drive roller dual toothed pulley 68a by means of belt $B_2$. Outlet roller pulley 76a has slightly fewer teeth per revolution than drive roller dual toothed pulley 68a. Outlet pinch rollers 80a,80b are biased away from the transport path P, for example by a resilient member 85 such as a spring shown in FIG. 5. As will be discussed in more detail below, at least one solenoid 86 causes outlet pinch rollers 80a,80b to overcome the biasing of resilient member 85 to form a nip with outlet roller 76 when the trailing end of the length of material M is sensed. This formation of the nip between outlet pinch rollers 80a,80b and outlet roller 76 causes a quick exit of the trailing end of the length of the material.

When material M is transported through channel 52, the speed of the material is maintained at a substantially constant velocity in the area about drive roller 68. While Applicants have successfully employed the present invention for speeds from 1–10 inches/second, higher and lower speeds can be accommodated using the apparatus and method of the present invention.

At least one sensor is mounted in overlapping orientation to the transport path in measurement region R to detect the leading and trailing ends of the length of material M during transport. More particularly, measurement region R is located along web relief track 60, intermediate drive pinch rollers 72a,72b. As shown in FIG. 10, the present invention preferably employs two sensors 90,92 mounted side-by-side on a sliding rail so as to be independently positioned, with the web measurement location disposed between the sensors. FIG. 10 illustrates this web measurement location by a cone C of light directed toward material M from optical probe 18. Suitable sensors are light emitting diode photodetector reflective pair assemblies such as Honeywell HOA1160-2. By detecting the leading and trailing end of the length of material M, the sensors are employed, for example, to start and stop the data acquisitions of the measurements. Sensors 90,92 may be slightly offset, with the sensors being positioned substantially opposing optical probe 18. This permits one sensor to detect the leading edge immediately prior to optical probe 18, with a resulting signal being used to start the measurements, and permits the other sensor to detect the trailing end immediately after optical probe 18, with a resulting signal being used to end the measurements. (One sensor may be used to detect both the leading edge and the trailing end.) Note that the leading and/or the trailing end of the length of material M may include knurled areas or other distinctive markings which may not be analyzed for thickness.

Figure 9:
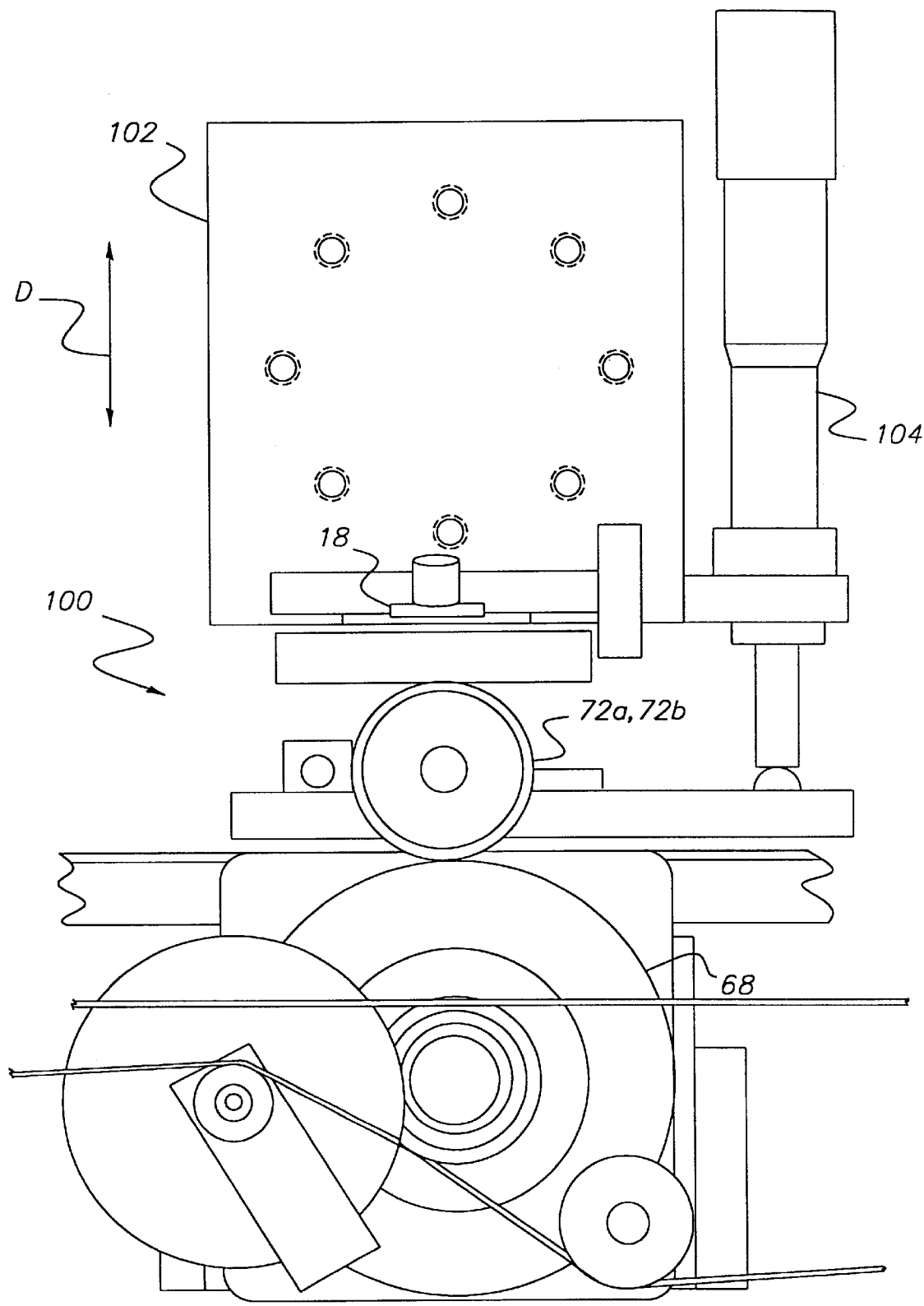
FIG. 9 shows and enlarged view of the drive roller and the optical mounting plate of FIG. 5.

As shown in FIG. 9, measurement and transport apparatus 50 also comprises a measurement mechanism 100 having an optical probe mounting plate 102, and a height adjusting apparatus 104, and optical probe 18. Adjusting apparatus 104 adjusts the position of optical probe mounting plate 102 relative to the transport path P, and move moves in a direction substantially perpendicular to the channel as illustrated in FIG. 9 by arrow D. Optical probe 18 is affixed to optical probe mounting plate 102.

Optical probe 18 is more particularly illustrated in FIGS. 11–14. As illustrated, optical probe 18 preferably includes a gimbal mount having a ball pivot point 108. Optical probe 18 is affixed to optical probe mounting plate 102 by a plurality of mechanical fasteners (not shown) and includes a fiber mount 112 such as a Rifocs Part No. DAK-13/FC. When optical probe 18 is affixed, it is positioned in overlapping relation to web relief track 60 of the transport path P over drive roller 68, and over sensors 90,92 (refer to FIG. 10). Adjusting members 110 provide adjustment to align optical probe 18 normal to channel 52 so as to be normal to the surface of material M as it moves along the transport path. Optical probe 18 is the interface between interferometer apparatus 20 and the length of material being measured.

Optical probe 18 preferably includes a GRIN lens. The positioning of optical probe 18 relative to the channel is dependent on the focal length of the optical probe. For example, in a GRIN lens, the focal length of the lens is strongly dependent on the lens to optical fiber spacing. For Applicant's particular application, a 3 mm diameter, 0.11 pitch NSG America (SLW 300011 130NCO) for 1300 nm operation with an approximate 28.5 mm focal length was utilized, a depth of focus of 2.5 mm and a focused beam spot size of 47 µm. The lens-to-fiber spacing is 4.7 mm. For the light to be normal to the axis of the GRIN lens, the light through the optical fiber must be centered on the GRIN lens axis. Accordingly, the lens must be properly aligned for accurate measurements.

In operation, once optical probe 18 is properly aligned, material M is transported along the transport path P through channel 52 to enter the nip formed by inlet roller 74 and inlet pinch rollers 78a,78b. As material M enters measurement region R and the nip formed by drive roller 68 and drive pinch rollers 72a,72b, one of sensors 90,92 senses the leading edge of the material, and the sensor provides a signal to initiate the acquiring of data. As the length of material M is transported past optical probe 18, optical probe 18 directs a beam of light toward a segment of the moving material. Interferometer apparatus 20 collects a portion of the light reflected from the optical interfaces of the segment of material M, and generates an interference signal representative of the collected light. When the other of sensors 90,92 senses the trailing end of the length within the measurement region R, the sensor provides a signal to stop the acquisition of data. In addition, solenoid 86 is activated to overcome the biasing of resilient member 85 and form a nip between outlet roller 76 and outlet nip rollers 80a,80b, causing the trailing end to quickly exit the channel. The data values acquired by data acquisition module 22 are converted to thickness values by analyzer 24 to provide a thickness profile of the material in the direction of movement.

Measurement Technique

The measurement technique is now more particularly described with reference to FIGS. 15–22. After optical probe 18 is properly mounted and aligned, interferometer apparatus 20 is initialized for operation. Predetermined values are selected for a motor amplitude and offset so as to identify triplet peak formations, as shown in absolute value representation in FIG. 16. Large amplitude peaks, (e.g., peaks 2, 5, 8, and 11) illustrated in FIG. 16 are referred to as zero-crossing peaks. A set of smaller peaks are adjacent to each zero-crossing peak (e.g., peaks 1, 3, 4, 6, 7 and 8). The distance between the large and small peaks (e.g., distance from 1–2, 2–3, and 4–5 of FIG. 16) are indicative of the optical path (nt). Accordingly, the interferometer motor amplitude and motor start position (offset) are selected such that the optical path (nt) is less than the intervals between adjacent small peaks (e.g., 3–4, 6–7, 9–10 in FIG. 16). In the present instance, a single interferometer motor scan would include three peaks having a small, large, and small amplitude. The interferometer motor scanning direction would change between peaks 3–4, 6–7, 9–10, etc, as shown in FIG. 16. Alternatively, the intervals between adjacent small peaks can be made to be consistently smaller than the optical path (nt). Appropriate gain levels are selected so as to not saturate amplifiers when zero-crossing peaks are present. The set of adjacent small interference peak amplitudes must also be large enough to exceed a required threshold value.

While not shown, note that as an alternative to triplet peak formations, predetermined values can be selected for a motor amplitude and offset so as to identify doublet peak formations.

By using the laser interferometer to trigger data acquisition of the non-coherent light interferometer, data is collected at constant distance intervals using an A-D converter. For ease of illustration, the data represented in FIG. 16 shows the absolute value of the A-D converter counts (vertical axis) versus the accumulated interferometer motor scan distance (horizontal axis).

The measurements are performed at a relatively constant interferometer motor scan frequency, for example at 10 Hz.

In addition, the speed of material M through a measurement zone (defined as an area in the channel about the optical probe) is predetermined and is substantially constant for ease of calculations. Further, a measurement time interval from start to stop trigger signals (i.e., the detection of the leading edge and the trailing end by sensors 90,92) can be used to determine the length of the length of material M. For ease of discussion, sensors 90,92 are disposed at the substantially same relative position within channel 52 as optical probe 18. Offsetting their positions would be accommodated by incorporating a constant and predetermined delay.

With interferometer apparatus 20 initialized for operation, the following steps are conducted to provide a thickness profile. The leading edge of the length of material M is inserted into inlet 12 of the transport path P so as to be disposed within channel 52 (step 200 illustrated in FIG. 15). Once the leading edge is inserted through the nip formed by inlet roller 82 and inlet pinch rollers 78a,78b, the length of material M is automatically transported through the channel (step 205) of FIG. 15). When the leading edge enters the drive pinch roller area (step 210), the leading edge is detected by sensor 90, and a signal is sent to interferometer apparatus 20 to initiate collection of interferometer data at constant distance intervals (step 215 of FIG. 15). Accordingly, digital signal amplitude data is sent and stored in a sequential data file, and the time at which the leading edge is detected is stored.

Figure 15:
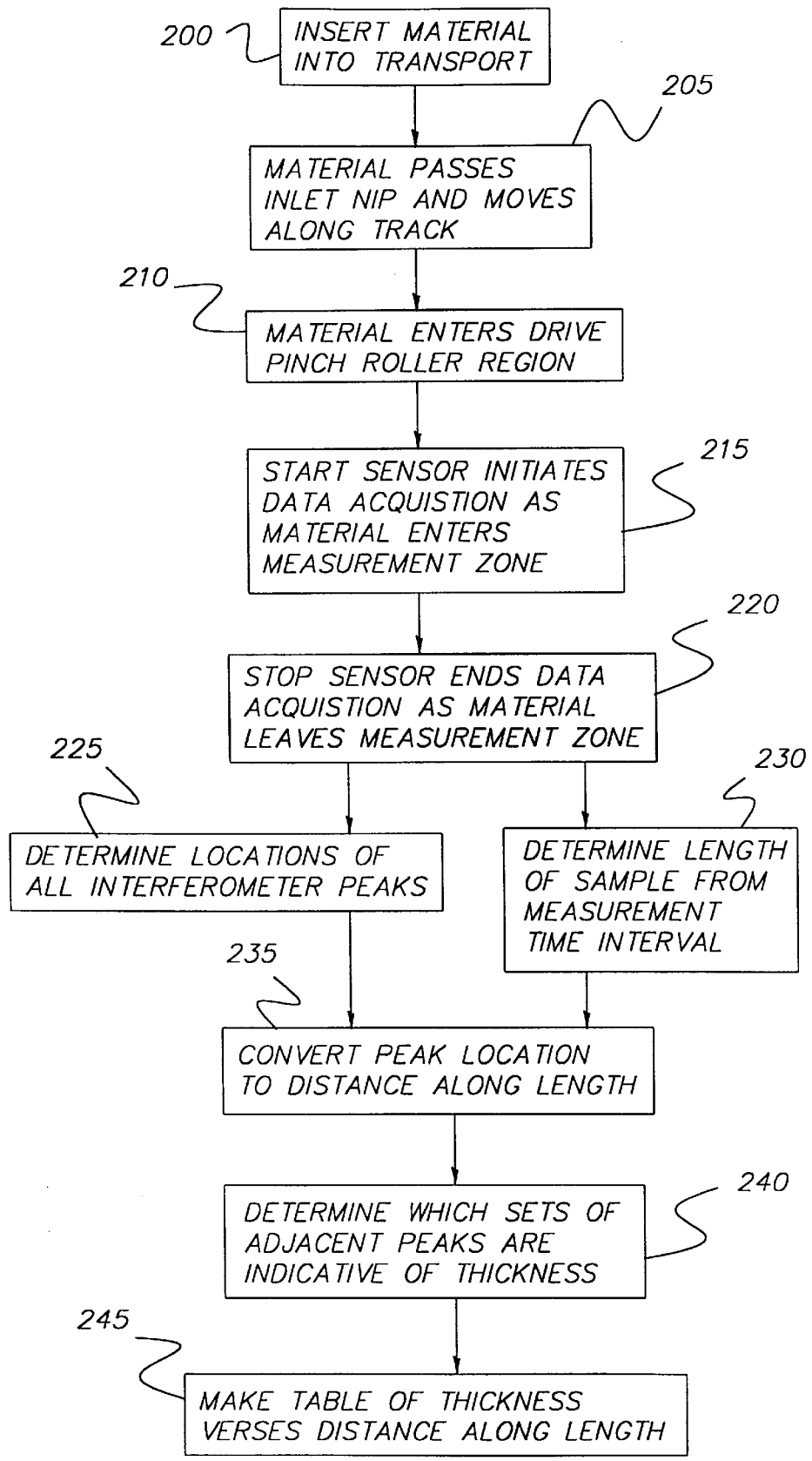
FIG. 15 shows a flow chart generally illustrating the operational method in accordance with the present invention.

When the trailing end of the length of material M is detected by sensor 92, the collection of interferometer data is stopped, and digital signal amplitude data is no longer sent and stored in the sequential data file (step 220 of FIG. 15). The time at which the trailing end is detected is also stored. For ease of discussion, a total number of data points is identified as q, with a data point index ranging from N=1 to q. Further, the first data point is defined as the origin; and the measurement distance interval between adjacent interferometer sampled data points is defined as δx. Consequently, the scan distance $d_j$ from the origin to the $N^{th}$ data point for j=1 to q is given by:

$$d_j=(j-1)\delta x$$

Similarly, the total scan distance $d_q$ is given by:

$$d_q=(q-1)\delta x$$

A first data point N=1 corresponds to the leading edge of the length of material M, and a last data point N=q corresponds to the trailing end.

A length L of the length of material M is calculated (step 230 of FIG. 15) using the time interval between the detection of the leading edge and trailing end by sensors 90,92 ($t_T$) and the predetermined transport speed ($V_T$). This length is given by:

$$L=V_T t_T.$$

An algorithm is used to process the sequential data file to determine the location(s) of all the peak positions P together with their amplitudes and distances from the first data point of the data file (step 225 of FIG. 15). Suitable algorithms are disclosed in U.S. Pat. No. 5,596,392 (Marcus et al) and U.S. Pat. No. 5,596,409 (Marcus et al), commonly assigned and incorporated herein by reference. An array of distances $D_j$ from the origin of the interference peaks for j=1 to P is then generated.

Figure 17:
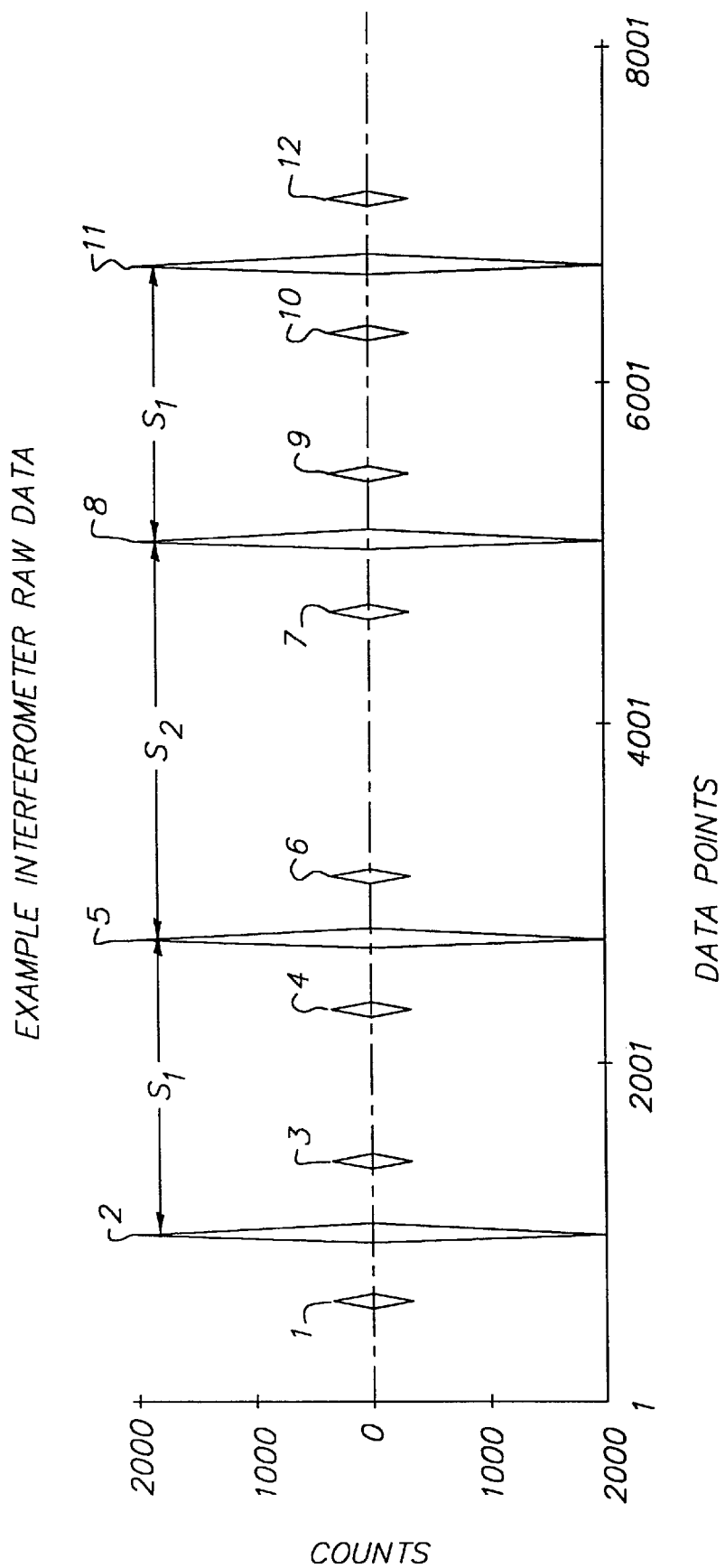
FIG. 17 shows generally shows a portion of the peak formations of FIG. 16.
Figures 18, 19:
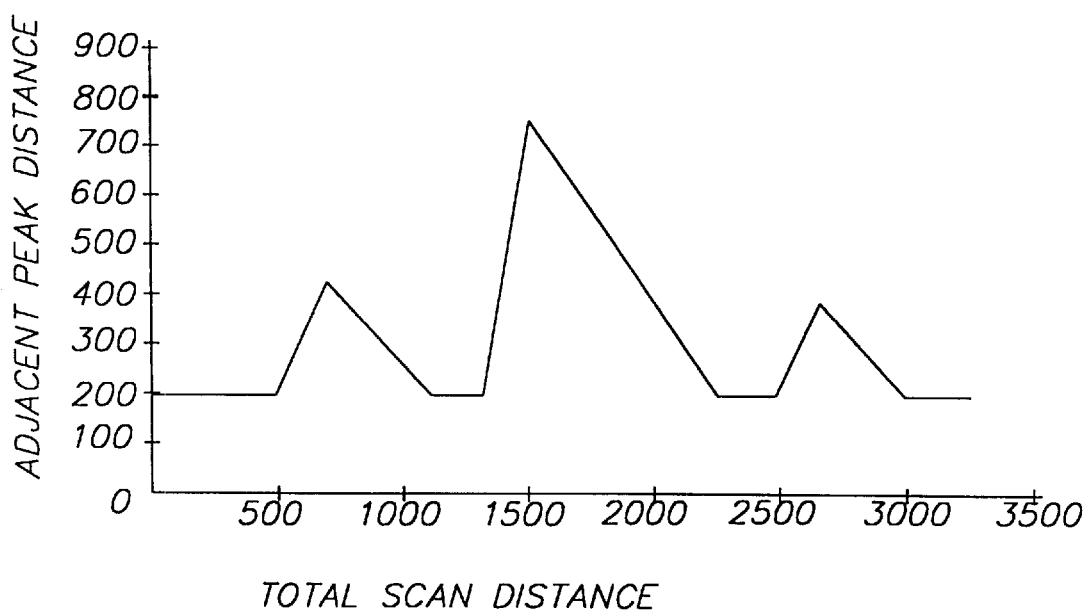
FIG. 18 shows a tabular format showing the distances between the peaks illustrated in FIG. 16.
FIG. 19 shows a graph of the table data of FIG. 18.

FIG. 17 illustrates a subset of the peaks shown in FIG. 16. Referring to FIG. 18, the first column of the data table shows, for each peak, a calculated distance $D_j$ from the origin of all the calculated peaks (step 235 of FIG. 15). The last row of the data tables shows the distance $D_q$ from the origin of the last data point which corresponds to the trailing end of the material.

The distances between all the pairs of adjacent peaks are then calculated. Referring to FIG. 18, the second column shows the adjacent distances for the peaks illustrated in FIG. 17. This data is also illustrated in graph form in FIG. 18.

A pattern recognition classifier, defined below, is used to assist in the determination of which sets of adjacent peaks should be utilized in a thickness profile determination (step 240 of FIG. 15). The small amplitude and large amplitude zero-crossing peaks can be thought of as binary signals of level 0 (small) and 1 (large). The third data column of FIG. 18 shows the amplitude classifier level for each of the peaks shown in FIG. 17. Applicants note that optical path length indicating peaks are due to a pair of adjacent peaks of amplitude classifier levels 0–1 or 1–0. Referring to FIG. 18, the sets of adjacent peaks which fulfill this criteria are peak sets 1–2, 2–3, 4–5, 5–6, 7–8, 8–9, 10–11, and 11–12.

When all the peaks are present (i.e., no loss of data) the usual sequence of adjacent amplitude peaks of 010010010010 occurs. The 010010 pattern can be construed as a pattern recognition classifier, indicating no loss of data. With some materials, it is possible that a double reflection could occur at twice the optical path. This would result in an adjacent peak pattern of 0010000100 for the classifiers. This pattern can be construed as a pattern recognition classifier for a double reflection. Only the adjacent peaks with amplitudes 0–1 and 1–0 would be used in the optical path measurement calculations. In some cases there may be lost data due to peaks not having enough amplitude. In this case, adjacent peak amplitude patterns such as 0101010010 may occur. To accommodate for this case, a thickness range acceptance criteria is devised in addition to the amplitude classifier selection criteria.

FIG. 17 of U.S. Pat. No. 5,596,392 (Marcus et al) and U.S. Pat. No. 5,596,409 (Marcus et al) illustrate an example of doublet peak formation in absolute value representation. The pattern recognition classifier for doublet peak formation without loss of data is 011001100 or 10011001100.

From the adjacent distance data, the peaks and locations are selected that meet both the classifier amplitude criteria and thickness range acceptance criteria for potential optical path indicative sets of peaks. The peaks that fit the acceptance criteria are stored in a subarray $T_i$ with their corresponding distances from the origin (step 245 of FIG. 15). (An example of an acceptance criteria is: product aim ±25 um.) For the example of FIGS. 17–18, 195±25 may be used as the acceptance criteria.

FIGS. 20–21 shows the processed data set for the data of FIGS. 17–18. The first column of data in FIG. 20 shows the selected peaks distances from the origin. The second column of FIG. 20 shows an optional adjusted distances $D_j'$ for the selected peaks. The adjusted distance calculation takes into account that the material is moving during the measurement. The average position of the material during a measurement is midway between the two adjacent peaks used in its optical path length calculation. For long lengths of material with many data points, the adjusted distance calculation is a minor correction and is not necessary. The third column of FIG. 20 shows the calculated locations of the measured points along the material length.

Note that the optional adjusted distances $D_j'$ for the selected peaks are calculated as follows. The optical path is equal to the distance between two adjacent peaks, thus the average location of the material during the measurement is at a distance halfway between the two peaks. The adjusted distance from the origin $D_j'$ of the $j^{th}$ thickness peak $T_j'$ is given by $$D'_j = D_j + \frac{T_j}{2}$$

The length L of material M per interferometer measurement distance interval (j=1–q) is given by $L/d_q$.

The location along the length of the material of the $j^{th}$ thickness peak $W_j$ is given by:

$$W_j = \frac{LDj}{d_q}$$

In some situations during a measurement, not all of the expected interferometer peaks may be observed, for example, due to scratches and excessive dirt on the material. To monitor "lost" peaks in a particular measurement, the measurement interval is divided into scanning intervals $S_1$ and $S_2$ as shown FIG. 17. With general measurement conditions, typically 4 measurements occur over the distance range $S_1+S_2$. Markers can be included to the data array to monitor lost data locations. This is used to prevent averaging over lost data regions, and is further discussed below with reference to FIG. 22.

Figure 22:
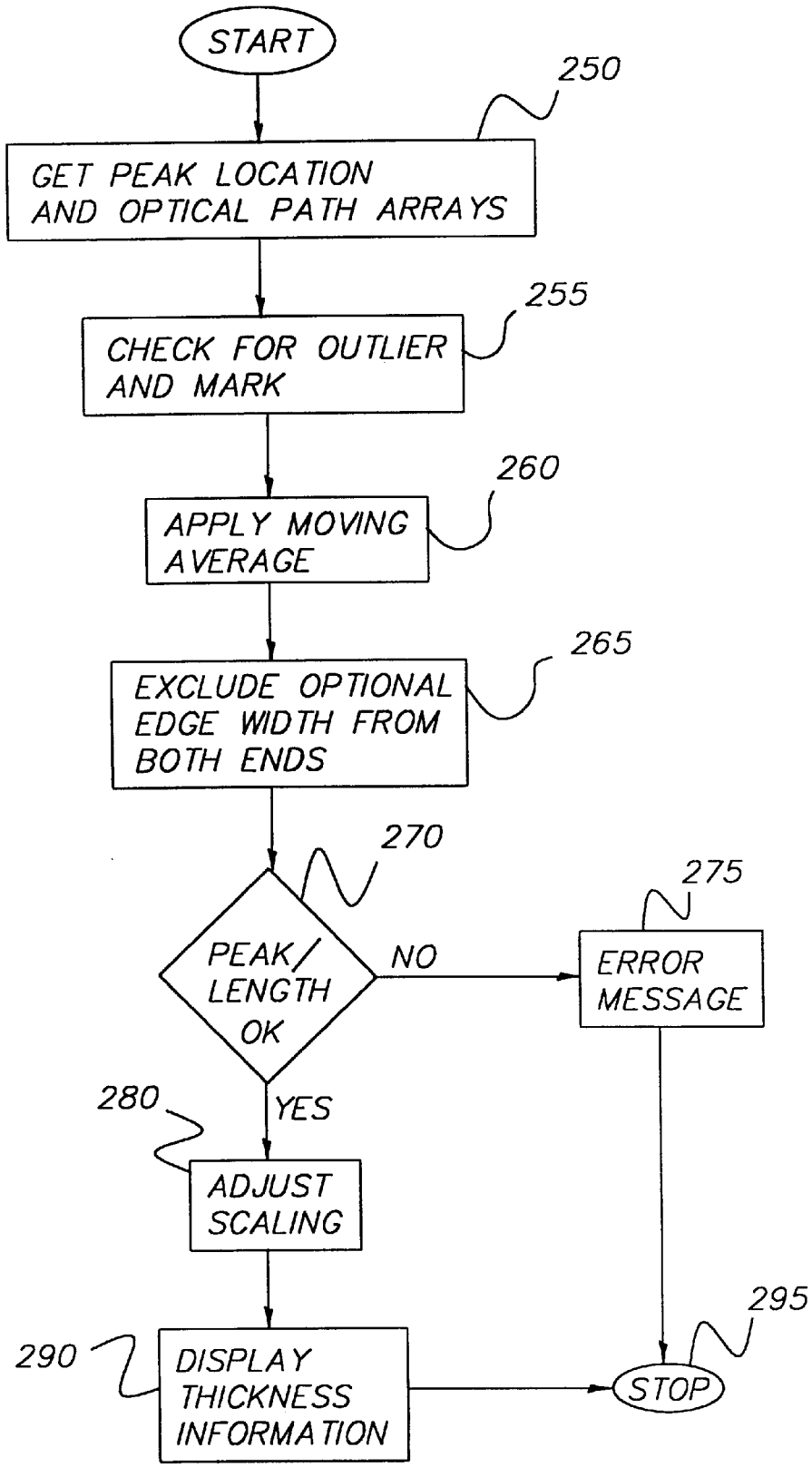
FIG. 22 shows a post processing method in accordance with the present invention.

FIG. 22 shows the post processing method to present a thickness profile once the table of thickness verses distance along the length is obtained (step 245 of FIG. 15). Applicants define an outlier as being a location wherein there is no thickness data or a location of a peak which does not meet the thickness acceptance range, and is out of the reasonable range of thickness based on the standard deviation of the data set. Accordingly, these outliers are searched for and marked (i.e., noted or flagged), for example, as having a zero value. As such, during the moving average calculation, the marked outliers are excluded from the average.

Thus, in post processing, outliers are searched for, and marked as having a zero value (step 255). The data may be averaged over several adjacent thickness measurements (step 260). For example, the data could be averaged over every 3-to-35 adjacent thickness measurements, excluding the zero marked outliers. As an example, for a three adjacent point moving average, the thickness at location m would become the average of locations m−1, m, and m+1. If location m+1 is an outlier, then the moving average will be an average of only locations m−1 and m. The selected averaging may depend on the number of measurements acquired. In addition, it may be desired to exclude the data collected at the leading edge and trailing end of the material (step 265), for example, if the ends are knurled (i.e., areas of raised ridges/bumps). Next, the number of measurements acquired is compared to the determined length of the material (step 230 of FIG. 15) to determine if an acceptable minimum number of data points has been obtained (step 270). For example, an acceptable minimum number could be 95 percent. If not, an error message is provided (step 275) and further calculations are not made (step 295). If an acceptable minimum is obtained, the distance scale is adjusted (step 280) and the thickness profile is displayed (step 290).

Further information about the measurement may be displayed. For example, it may be desirable to visually display the location and magnitude of the three highest local slopes on the thickness profile. Various other material statistics may be desired, for example, average thickness, standard deviation, and maximum and minimum deviation from a desired aim thickness along with their locations.

Applicants have found the present invention suitable for lengths of material up to 200 feet. Cutting of material M may be advantageous in particular applications, particularly if a supply of web material is being measured. Therefore, a cutting mechanism (not shown) may be optionally disposed along the transport path, prior to the inlet of the channel. This cutting mechanism would allow for various lengths of material to be measured from the supply.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An apparatus for determining a thickness profile of a moving material having at least two optical interfaces, comprising:

a transport apparatus transporting a length of the moving material in a first direction along a transport path through a measurement region and maintaining a substantially constant velocity of the length through the measurement region, the transport apparatus including a channel maintaining a predetermined flatness to the moving length through the measurement region and a recessed track to provide an area of non-contact in the measurement region;

a beam of light directed toward a segment of the moving length within the measurement region;

an interferometer apparatus collecting a portion of the light reflected from the optical interfaces of the segment of the moving length and generating an interference signal representative of the collected light; and an analyzer analyzing a plurality of the interference signals to determine a thickness profile of the material in the first direction.

2. The apparatus according to claim 1 wherein the interferometer apparatus is comprised of a dual interferometer apparatus in an autocorrelation mode.

3. The apparatus according to claim 1 wherein the predetermined flatness is maintained to at least one degree of normal from the transport path.

4. The apparatus according to claim 1 wherein the channel comprises a bottom wall having the recessed relief track, two side walls, and two top walls spaced apart to provide an opening in the channel through which the beam of light is directed.

5. The apparatus according to claim 1 further comprising at least one sensor disposed within the measurement region to detect a leading end and a trailing end of the moving material.

6. The apparatus according to claim 5 wherein a pair of sensors is disposed within the measurement region, one of the pair of sensors detecting a leading end of the moving material and the other of the pair of sensors detecting a trailing end of the moving material.

7. The apparatus according to claim 1 further comprising static-preventing members to prevent static build-up on the material.

8. The apparatus according to claim 1 wherein the transport apparatus further comprises a drive means for transporting the material along the transport path through the channel, the drive means including an inlet roller disposed near an inlet end of the channel, an outlet roller disposed near an outlet end of the channel, and a drive roller disposed in the measurement region, each of the inlet, outlet, and drive rollers being in mechanical association, and each of the inlet, outlet, and drive rollers having a corresponding pinch roller to form a nip through which the material is transported.

9. The apparatus according to claim 8 wherein the inlet roller has a speed slightly less than a speed of the drive roller, and the outlet roller has a speed slightly greater than the speed of the drive roller.

10. The apparatus according to claim 1 further comprising a mounting member for positioning the beam of light adjacent the measurement region in a direction substantially normal to the transport path.

11. The apparatus according to claim 10 wherein the mounting member includes a gimbal mount.

12. The apparatus according to claim 1 further comprising a GRIN lens and an optical probe mount supporting the GRIN lens.

* * * * *